United States Patent [19]
Colbath

[11] 3,903,723
[45] Sept. 9, 1975

[54] ROLL-FORMING MACHINE FOR MAKING ARTICLES HAVING VARYING CROSS-SECTIONAL CONFIGURATIONS

[76] Inventor: Dan L. Colbath, P.O. Box 1003, Sherman, Tex. 75090

[22] Filed: May 28, 1974

[21] Appl. No.: 473,794

Related U.S. Application Data

[63] Continuation-in-part of Ser. No. 355,673, April 30, 1973, Pat. No. 3,748,884.

[52] U.S. Cl. .................. 72/178; 72/181; 72/187; 72/240
[51] Int. Cl.² .......................................... B21D 5/08
[58] Field of Search ............ 72/187, 184, 127, 181, 72/176, 177, 226, 240, 178

[56] References Cited
UNITED STATES PATENTS

| | | | |
|---|---|---|---|
| 2,029,552 | 2/1936 | Barnhart | 72/187 |
| 2,612,934 | 10/1952 | Duboscland | 72/240 X |
| 2,655,823 | 10/1953 | Cozzo | 72/240 X |
| 3,361,319 | 1/1968 | Sato et al. | 72/178 X |

Primary Examiner—Milton S. Mehr
Attorney, Agent, or Firm—Richards, Harris & Medlock

[57] ABSTRACT

A roll-forming machine includes a plurality of roll-stands for moving material along a predetermined path and a plurality of die-stands for progressively transforming the material from an initial configuration to a desired configuration. The die-stands are mounted on and positioned by an elongate, rigid, spine which permits conversion of the machine from one roll-forming configuration to another by replacing the spine and the die-stands mounted thereon with a different spine/die-stand assembly.

The die-stands of the roll-forming machine comprise non-driven forming rollers which engage a workpiece as it moves through the roll-forming machine under the action of the roll-stands. During the operation of the roll-forming machine, the positioning of at least certain forming rollers on the die-stands relative to the path of workpiece movement is continuously varied as the workpiece moves through the roll-forming machine to form the workpiece into a desired configuration in which the cross-sectional configuration varies along the length of the workpiece. In certain embodiments of the invention the positioning of all of the forming rollers of the die-stands is continuously varied in a direction extending transversely to the direction of workpiece movement. By this means there is formed a workpiece having a width dimension which varies lengthwise thereof. In other embodiments the positioning of at least one forming roller on each die-stand is continuously varied relative to the positioning of other rollers on the die-stands and relative to the path of workpiece movement. By this means the workpiece is formed into a desired configuration having at least two dimensions which vary along the length thereof.

20 Claims, 9 Drawing Figures

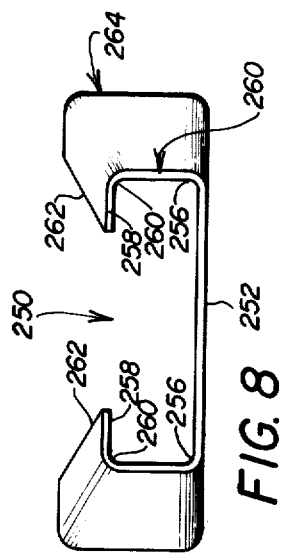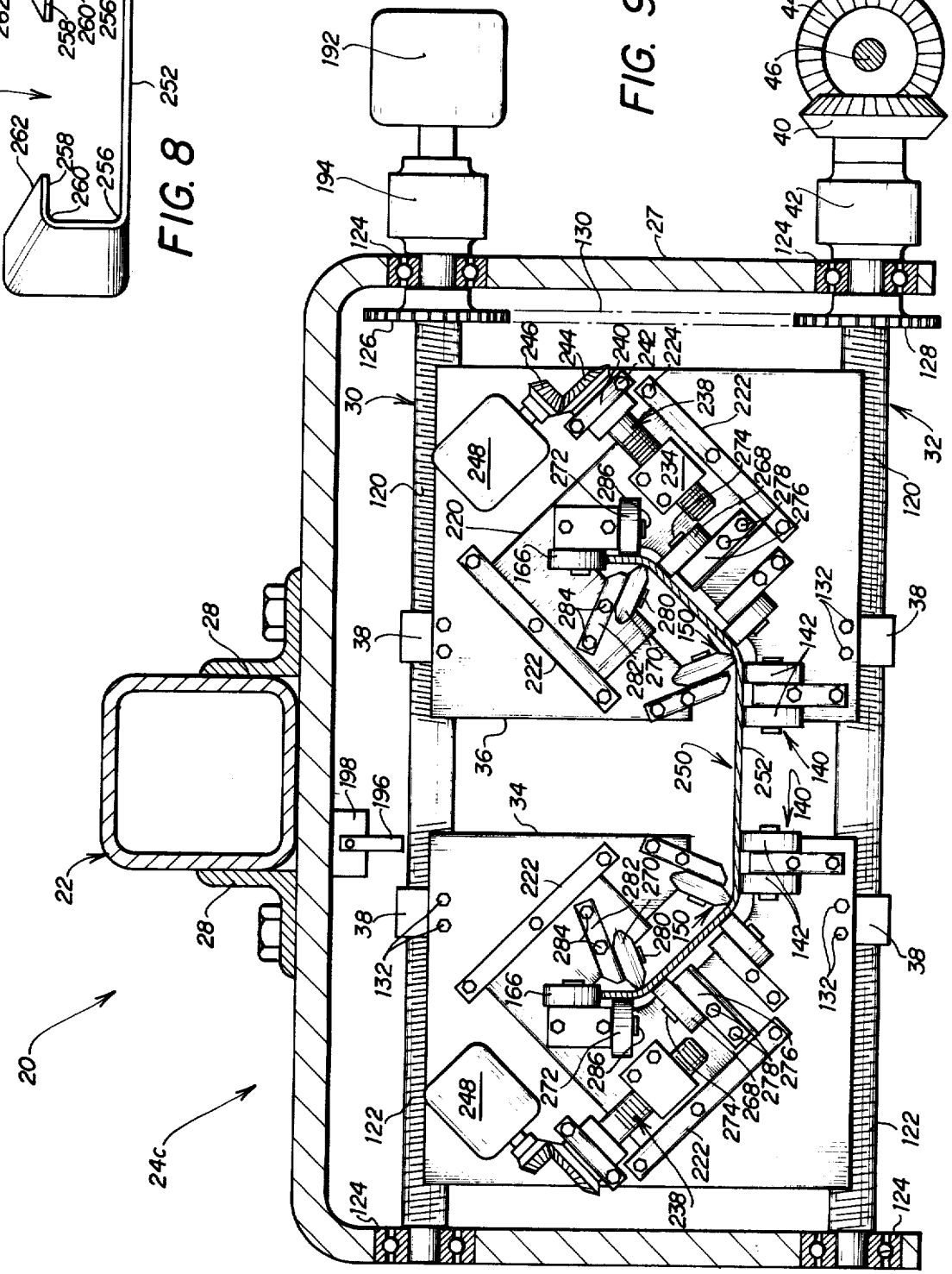

ROLL-FORMING MACHINE FOR MAKING ARTICLES HAVING VARYING CROSS-SECTIONAL CONFIGURATIONS

CROSS REFERENCE TO RELATED APPLICATION

This application is a continuation-in-part of co-pending application Ser. No. 355,673, filed Apr. 30, 1973, now U.S. Pat. No. 3,748,884.

BACKGROUND AND SUMMARY OF THE INVENTION

U.S. Pat. No. 3,748,884 granted to Dan L. Colbath on July 31st, 1973, discloses a roll-forming machine including a plurality of roll-stands each comprising non-forming rollers which function to move material along a predetermined path. The roll-forming machine further includes a plurality of die-stands each comprising non-driven material engaging rollers which function to transform the material from an initial configuration to a desired configuration. The die-stands are mounted on and positioned relative to the path by an elongate, rigid spine. This permits conversion of the machine from one roll-forming configuration to another by removing the spine and the die-stands attached thereto and then installing a different spine/die-stand assembly in the roll-forming machine.

In co-pending application Ser. No. 355,673, there is disclosed a roll-forming machine also including roll-stands for transporting material along a predetermined path and die-stands for progressively transforming the material from an initial configuration to a desired configuration. The roll-forming machine is similar to that described above in connection with U.S. Pat. No. 3,748,884 in that the die-stands are mounted on a rigid spine to facilitate conversion of the roll-forming machine from one roll-forming configuration to another. The major difference between the two roll-forming machines relates to the fact that in the latter machine the roll-stands comprise non-forming lower driving rollers only. Idler rollers are mounted on the spine for cooperation with the lower driving rollers to drive materials through the roll-forming machine.

Although roll-forming machines incorporating the above-described inventions have enjoyed substantial commercial success, certain limitations have been encountered in their use. For example, in both machines the positioning of the material driving rollers of the roll-stands transversely relative to the direction of movement of material through the roll-forming machine is fixed. This is somewhat limiting with respect to the width of materials that can be accommodated in the roll-forming machine. Similarly, the positioning of the material engaging rollers of the die-stands of the above-described roll-forming machines is fixed. This requires the substitution of a new spine/die-stand assembly even though the roll-forming configuration represented by the new spine/die-stand assembly differs from that of the prior assembly only to a relatively minor degree.

Co-pending application Ser. No. 458,295, filed Apr. 5, 1974, by Dan L. Colbath for ROLL-STAND FOR ROLL-FORMING MACHINE discloses certain improvements relating to both of the above-described roll-forming machines. In one aspect these improvements relate to accommodating roll-forming machines for use in conjunction with materials of various widths. This is accomplished by mounting the rollers of the roll-stands for selective positioning transversely with respect to the path of movement of material through the roll-forming machines.

Co-pending application Ser. No. 473,793, filed May 28, 1974 herewith by Dan L. Colbath for DIE-STAND FOR ROLL FORMING MACHINE (B2829) relates to improvements in die-stands for roll-forming machines whereby the roll-forming configuration of a roll-forming machine may be changed without the necessity of installing a different spine/die-stand assembly. In accordance with the certain aspects of the improvements, all of the material engaging rollers on at least one side of each die-stand are selectively positionable as a group with respect to the path of material movement through the roll-forming machine, thereby changing the roll-forming configuration of the machine. Also, certain rollers of the group may be selectively positionable with respect to the remaining rollers, thereby further changing the roll-forming configuration of the machine.

One factor which is consistent through all of the abovedescribed roll-forming machines and improvements relating thereto is that the cross-sectional configuration of the workpiece formed by the roll-forming machine is consistent through its length. It is true that the co-pending application entitled DIE-STAND FOR ROLL-FORMING MACHINE (B2829) discloses apparatus whereby the roll-forming configuration of the roll-forming machine may be changed without removing the spine/die-stand assembly therefrom, and that the co-pending application entitled ROLL-STAND FOR ROLL-FORMING MACHINE (B2834) discloses apparatus for varying the positioning of the drive rollers of the roll-stands of a roll-forming machine and thereby accommodating workpieces of various widths in the roll-forming machine. However, once these adjustments are made, the positioning of both the non-driven forming rollers of the die-stands and the drive rollers of the roll-stand remains fixed throughout the roll-forming operation, and, accordingly, the cross-sectional configuration of the workpiece formed by the roll-forming machine is constant throughout the length of the workpiece.

The present invention relates to further improvements in the art of roll-forming machines whereby a roll-forming machine may be utilized in the fabrication of workpieces in which the cross-sectional configuration varies lengthwise thereof. In accordance with the broader aspects of the invention, the positioning of at least predetermined forming rollers of the die-stands of the roll-forming machine is varied continuously relative to the path of workpiece movement as the workpiece moves through the roll-forming machine. The rate of movement of the rollers relative to the path of workpiece movement is precisely coordinated with the rate of movement through the roll-forming machine so as to form the workpiece into the desired configuration.

In accordance with more specific aspects of the invention, the forming rollers of the die-stands of the roll-forming machine are mounted on plates which are in turn supported on frames depending from the spine. As the workpiece moves through the roll-forming machine, the positioning of the plates and the forming rollers carried thereby is continuously varied in a direction extending transversely to the direction of workpiece movement. By this means there is formed a workpiece in which at least one transverse dimension continuously varies lengthwise of the workpiece.

In accordance with other aspects of the invention, the positioning of at least one forming roller on each plate may be varied relative to the path of workpiece travel as the workpiece moves through the roll-forming machine. By this means the workpiece is formed into a desired configuration having at least two dimensions which vary along the length of the workpiece.

In accordance with still other aspects of the invention, the spine of the spine/die-stand assembly carries a guide assembly including guide members which function to guide the workpiece into the roll-forming machine. The positioning of the guide members of the guide assembly is also continuously varied with respect to the path of workpiece travel as the workpiece moves through the roll-forming machine. This is highly advantageous in assuring the proper movement of the workpiece into and through the roll-forming machine.

In accordance with still other aspects of the invention, the positioning of the plates of the die-stand and the positioning of the guide members of the guide assembly is individually adjustable prior to the beginning of the roll-forming operation. This facilitates adjustment of the initial configuration of the component parts of the spine/die-stand assembly prior to the roll-forming operation, thereby assuring the proper positioning of the forming rollers to engage and form the workpiece into the desired configuration.

DESCRIPTION OF THE DRAWINGS

A more complete understanding of the invention may be had by referring to the following Detailed Description when taken in conjunction with the accompanying Drawings, wherein:

FIG. 8 is an illustration of still another cross-sectional configuration which may be formed utilizing the invention; and FIG. 9 is an illustration of a die-stand incorporating a third embodiment of the invention.

DETAILED DESCRIPTION

Figure 1:
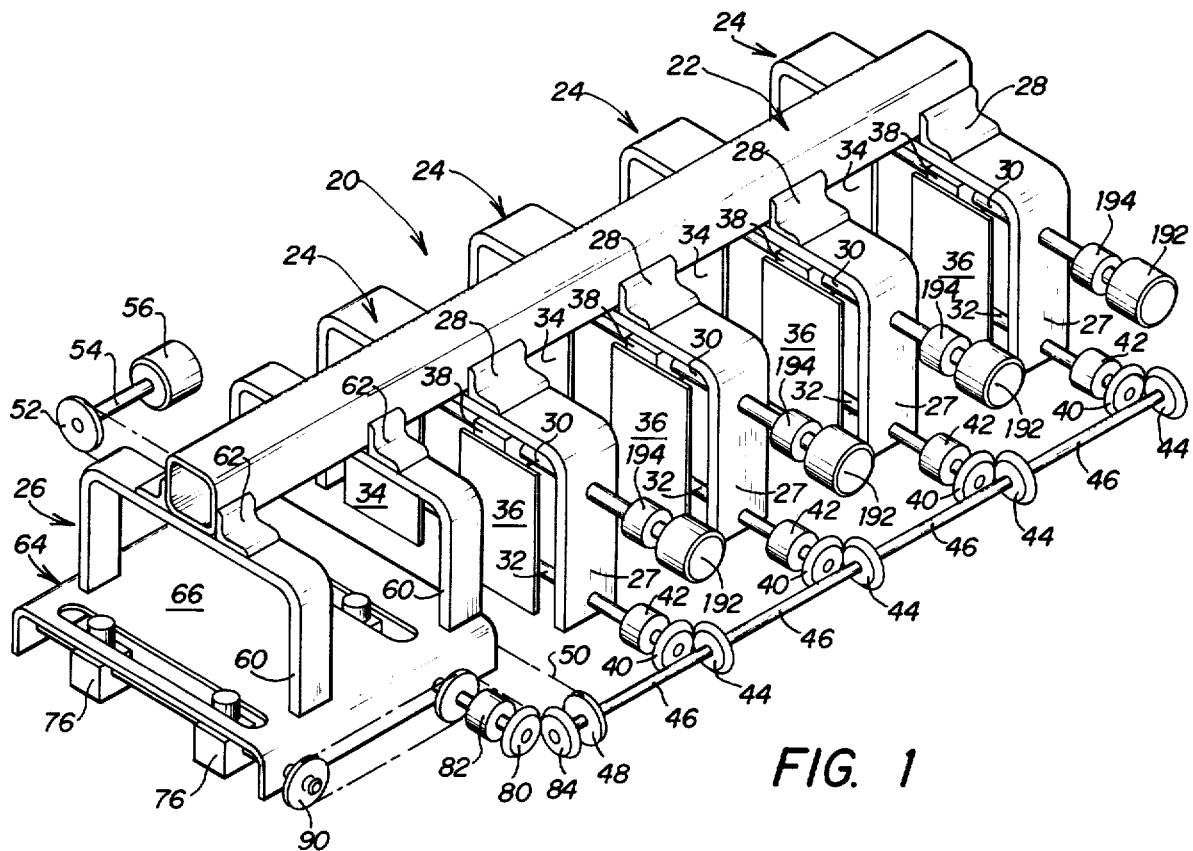
FIG. 1 is a perspective view illustrating a spine/die-stand assembly incorporating a first embodiment of the invention.

Referring now to the Drawings, and particularly to FIG. 1 thereof, a spine/die-stand assembly 20 utilized in the practice of the invention is diagrammatically illustrated. The assembly 20 includes an elongate, rigid spine 22 which supports a plurality of die-stands 24 and a guide assembly 26. The spine 22 functions to position the die-stands 24 and the guide assembly 26 relative to the path of travel of a workpiece through a roll-forming machine, whereby the guide assembly 26 guides the workpiece into the roll-forming machine and the die-stands 24 function to progressively transform the workpiece from an initial configuration to a desired configuration.

Each die-stand 24 comprises a rigid frame 27 which is secured to the spine 22 by means of brackets 28. Each frame 27 may be secured to its respective bracket 28, and the brackets 28 may in turn be secured to the spine 22 by means of suitable fasteners and/or by means of welding. Each frame 27 rotatably supports an upper lead screw 30 and a lower lead screw 32. Each die-stand 24 further comprises a left-hand plate 34 and a right-hand plate 36. The plates 34 and 36 are secured to members 38 which are in turn threadedly engaged with the lead screws 30 and 32.

In the practice of the invention, the plates 34 and 36 of each die-stand 24 each support one or more forming members which are positioned for engagement with a workpiece as it passes through a roll-forming machine. Since the forming members are mounted on the plates 34 and 36, and since the plates 34 and 36 are supported by the members 38 which are threadedly engaged with the lead screws 30 and 32, it will be understood that upon rotation of the lead screws 30 and 32, the positioning of the forming members may be varied relative to the path of workpiece movement. More precisely, upon actuation of the lead screws, the positioning of the forming members supported by the plates 34 and 36 is varied in a direction extending transversely to the direction of workpiece movement.

The lower lead screw 32 of each die-stand 24 is coupled to a bevel gear 40 through an electrically operated clutch 42. Each bevel gear 40 is mounted in mesh with a mating bevel gear 44 mounted on a drive shaft 46. The drive shaft 46 extends to a sprocket 48. A chain 50 extends around the sprocket 48 and a sprocket 52 mounted on the output shaft 54 of the motor 56. Thus, upon actuation of the motor 56 and assuming that all of the clutches 42 are engaged, the positioning of all of the forming members comprising the spine/die-stand assembly 20 is simultaneously varied relative to the path of movement of a workpiece through a roll-forming machine incorporating the assembly 20.

The guide assembly 26 of the spine/die-stand assembly 20 includes a pair of rigid frames 60 which are secured to the spine 22 by means of brackets 62. The frames 60 in turn support an inverted U-shaped plate member 64. The plate member 64 has an upper surface 66 which serves to support and guide a workpiece as it enters a roll-forming machine incorporating the spine/die-stand assembly 20.

Figure 2:
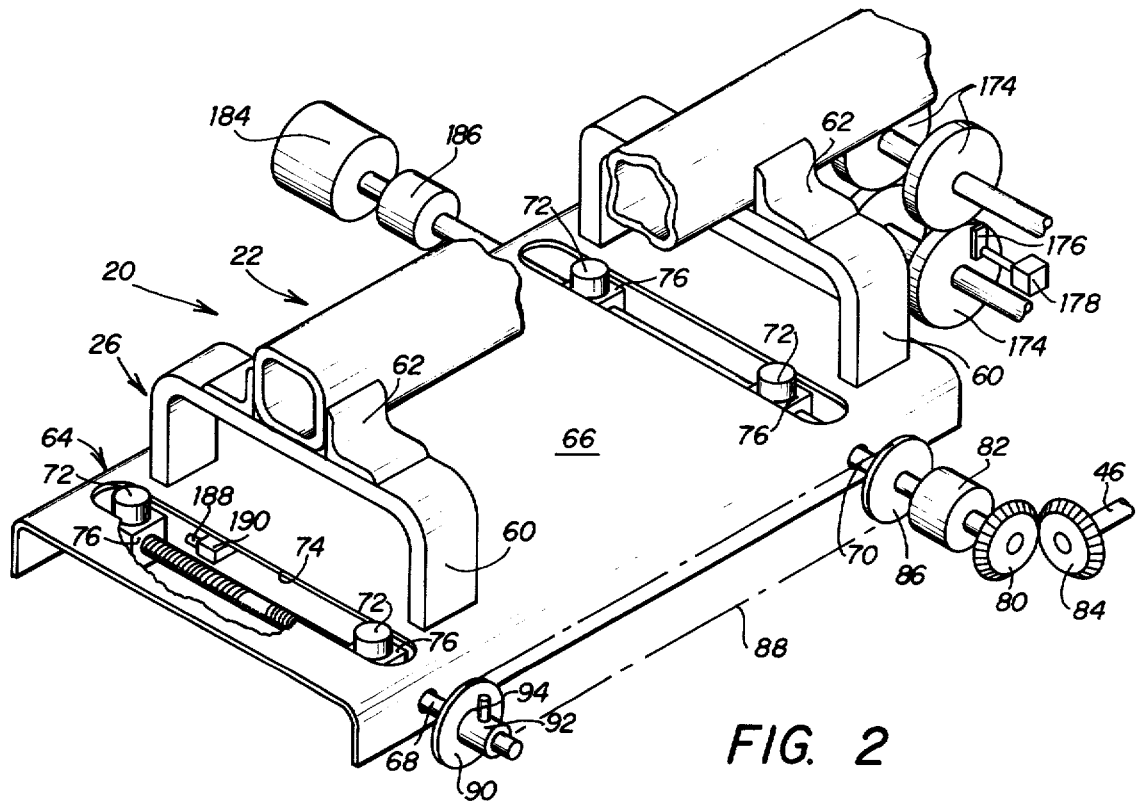
FIG. 2 is a perspective view illustrating the guide assembly of the spine/die-stand assembly of FIG. 1.

As is perhaps best shown in FIG. 2, the plate member 64 of the guide assembly 26 rotatably supports a rearward lead screw 68 and a forward lead screw 70 (both considered with respect to the workpiece). Guide rollers 72 extend through slots 74 formed in the plate member 64 and are supported on members 76 which are in turn threadedly engaged with the lead screws 68 and 70. Thus, upon rotation of the lead screws, the positioning of the guide rollers 72 is varied relative to the path of workpiece movement into and through the roll-forming machine.

The forward lead screw 70 is connected to a bevel gear 80 through an electrically operated clutch 82. The bevel gear 80 is mounted in mesh with a bevel gear 84 secured to the drive shaft 46. A sprocket 86 is mounted on the lead screw 70 and a chain 88 extends around the sprocket 86 and a sprocket 90 mounted on the lead screw 68. Thus, assuming that the clutch 82 is engaged, the positioning of all of the guide rollers 72 comprising the guide assembly 26 can be simultaneously varied relative to the path of workpiece movement into and through the roll-forming machine under the action of the motor 56.

The sprocket 90 is connected to the lead screw 68 by means of a collar 92 and a set screw 94. This is to facilitate the initial positioning of the rearward set of guide rollers 72 relative to the forward set of guide rollers 72. Thereafter, the set screw 94 is utilized to secure the collar 92 and the sprocket 90 carried thereby to the lead screw 68 throughout the operation of the roll-forming machine incorporating the present invention.

Figure 3:
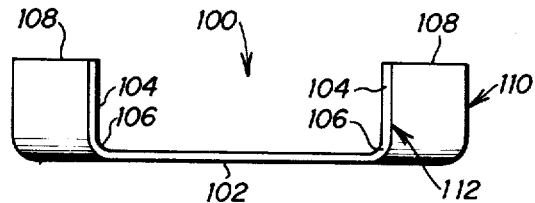
FIG. 3 is an illustration of a workpiece which may be formed by means of the invention.

Referring now to FIG. 3, there is shown a typical workpiece 100 formed in accordance with the present invention. The workpiece 100 includes a base or web 102 and opposed sides or flanges 104. The flanges 104 are separated from the web 102 by bends 106 and extend to edges 108. The workpiece 100 is received in the roll-forming machine in an entirely flat state, and the flanges 104 are progressively formed in the workpiece 100 as the workpiece travels through the roll-forming machine. The workpiece 100 differs from workpieces formed in typical prior art roll-forming machines in that the width dimension of the web 102 varies continuously along the length of the workpiece 100 from a relatively wide end 110 to a relatively narrow end 112. Those skilled in the art will appreciate the fact that the workpiece 100 illustrated in FIG. 3 is representative only, and in particular that workpieces formed by roll-forming machines incorporating the present invention may be either substantially less complicated or substantially more complicated than the workpiece of FIG. 3.

Figure 4:
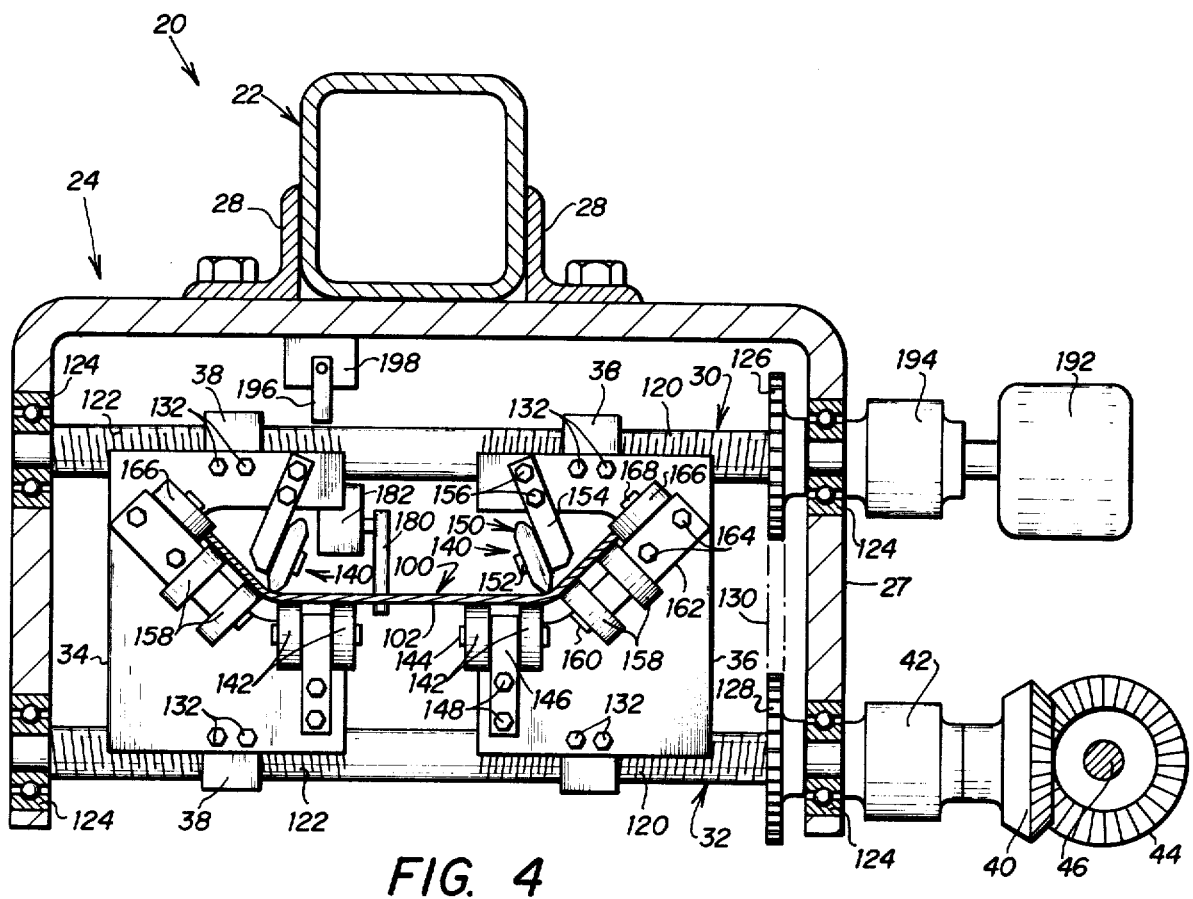
FIG. 4 is an illustration of a typical die-stand of the spine/die-stand assembly of FIG. 1.

In FIG. 4, a die-stand 24 which may be utilized in the spine/die-stand assembly 20 of FIG. 1 to form the workpiece 100 of FIG. 3 is illustrated in detail. The upper and lower lead screws 30 and 32 have left-hand threaded portions 120 and right-hand threaded portions 122. The lead screws are rotatably supported on the frame 27 by anti-friction bearings 124. Sprockets 126 and 128 are mounted on the upper and lower lead screws, respectively, and a chain 130 extends around the sprockets 126 and 128, whereby the lead screws 30 and 32 are constrained to concurrent rotation. The members 38 are either left-hand threaded or right-hand threaded depending on the portion of the lead screw with which they are engaged, and are secured to the plates 34 and 36 by means of fasteners 132.

The die-stand 24 further comprises two sets of rollers 140 positioned for engagement with the workpiece 100 as it passes through a roll-forming machine incorporating the spine/die-stand assembly 20. Each set of rollers 140 includes a pair of support rollers 142 which are rotatably supported on a shaft 144 for engagement with the base 102 of the workpiece 100. The shaft 144 is in turn supported by a bracket 146 which is secured to the plate 34 or 36 by means of fasteners 148. A toroidal roller 150 is positioned for engagement with the workpiece 100 along a line corresponding to the bend 106. As used herein the term "toroidal roller" means a roller having a material engaging surface which is curved at right angles to the axis of rotation of the roller, as opposed to a cylindrical roller which has a material engaging surface that is parallel to the axis of rotation of the roller. The toroidal roller 150 is rotatably supported on a shaft 152 which is in turn supported on the plate 34 or 36 by means of a bracket 154 and fasteners 156.

At least one primary bend roller 158 is mounted for engagement with the workpiece 100 at a point beyond the line of engagement of the toroidal roller 150 with the workpiece. The primary bend roller 158 is rotatably supported on a shaft 160 which is in turn secured either to the plate 34 or to the plate 36 by means of a bracket 162 and a pair of fasteners 164. As will be understood by those skilled in the art, the primary bend roller 158 is so positioned as to bend the outer portion of the workpiece 100 towards the toroidal roller 150, thereby partially forming the flange 104 and the bends 106 on one side of the workpiece.

A guide roller 166 is mounted for engagement with one edge 108 or the workpiece 100. The guide roller 166 is rotatably supported on a shaft 168 which is in turn supported on the bracket 162. As is well known to those skilled in the art, the roller arrangement conventionally utilized in roll-forming machines can cause numerous problems in the operation of the device. For example, if a bend is formed on one side only of a workpiece, the forces which are applied to the workpiece in the formation of the bend typically cause the workpiece to tend to move out of its proper path through the roll-forming machine. Even if identical bends are formed in the opposite sides of the workpiece, the forces which are applied to the workpiece in the formation of the bends can cause buckling of the center portion of the workpiece, particularly in the case of a relatively wide workpiece. Finally, variations in the workpiece such as non-uniformity of thickness, etc. can cause the workpiece to tend to move out of its proper path of travel even though the forces which are applied in the formation of the bends in the workpiece are wholly contained.

The roller arrangement illustrated in FIG. 4 overcomes these and other problems of the prior art. The toroidal roller 150 is mounted for rotation in a plane which bisects the plane of rotation of the support rollers 142 and the plane of rotation of the primary bend rollers 158. This fact together with the toroidal configuration of the roller 150 causes the roller 150 to absorb substantially the entire force that is applied to the workpiece by the primary bend rollers 158 in forming the bend 106 and the flange 104 of the workpiece 100. Additionally, the guide roller 166 absorbs any forces not absorbed by the toroidal roller 150 and/or forces resulting from variations in material thickness, etc., and thereby constrains workpiece to movement along its proper path of travel through the roll-forming machine. In this regard it will be understood that the roller 166 mounted on the plate 36 functions primarily to absorb forces generated on the opposite side of the roll-forming machine and/or forces tending to move the workpiece to the right (FIG. 4) and that the roller 166 mounted on the plates 34 is utilized to absorb forces generated on the opposite side of the roll-forming machine and/or forces tending to move the workpiece to the left (FIG. 4).

The spine/die-stand assembly 120 is utilized in conjunction with a roll-forming machine of the type utilized in U.S. Pat. No. 3,748,884 granted to Dan L. Colbath on July 31st, 1973. Such a device includes a frame which receives the spine 22 of the assembly 20, whereby the spine 22 and the frame of the roll-forming machine function to properly position the guide assembly 26 and all of the die-stands 24 relative to the path of movement of a workpiece through the roll-forming machine. The roll-forming machine further includes a plurality of roll-stands which are preferably constructed in accordance with the disclosure of the copending application of Dan L. Colbath filed Apr. 5, 1974, Ser. No. 458,295, for ROLL-STAND FOR ROLL-FORMING MACHINE, and which functions to drive the workpiece through the roll-forming machine and through the die-stands 24 of the assembly 20. A more complete understanding of the operation of such a roll-forming machine may be had by reference to U.S. Pat. No. 3,748,884, and by reference to co-pending application Ser. No. 458,295, the disclosures of which are incorporated herein by reference.

In the operation of a roll-forming machine incorporating the spine/die-stand assembly 20, the guide rollers 72 of the guide assembly 26 and the plates 34 and 36 and the forming members supported thereon are all initially positioned to receive one end of a workpiece. In this regard, the clutches 42 and 82 of the assembly 20 are initially disengaged. It will be understood that in order to form the workpiece 100 illustrated in FIG. 3, the workpiece received in the roll-forming machine has a tapered configuration. The rearward guide rollers 72 are therefore positioned somewhat farther apart than the forward rollers 72, the set screw 94 being utilized to effect proper initial positioning of the forward rollers 72.

The motor 56 is actuated to continuously rotate the drive shaft 46. Referring particularly to FIG. 2, a workpiece is received on the surface 66 of the guide assembly 26 and between the guide rollers 72 thereof, and is advanced until it is received between the drive rollers 174 comprising the first roll-stand of the roll-forming machine. Simultaneously, the front end of the workpiece engages a level 176 which actuates a switch 178. Actuation of the switch 178 engages the clutch 82 whereby the positioning of the guide rollers 72 of the guide assembly 26 is continuously varied outwardly with respect to the path of workpiece movement in accordance with the tapered configuration of the workpiece. The rate of movement of the guide rollers 72 depends on the speed of operation of the motor 56, the ratio between the sprockets 52 and 48, the ratio between the bevel gears 84 and 80, and the pitch of the lead screws 70 and 68, all of which are selected in order that the guide rollers 72 are continuously positioned in engagement with the edges of the workpiece as it moves into the roll-forming machine.

Referring again to FIG. 4, each die-stand 24 of the spine/die-stand assembly 20 includes a lever 180 positioned for engagement by the front end of a workpiece passing through the roll-forming machine. Upon engagement of the lever 180 by the workpiece, a switch 182 is tripped. Upon actuation of the switch 182, the clutch 42 of the die-stand 24 is engaged whereupon the motor 56 functions through the sprocket 52, the chain 50, the sprocket 48, the drive shaft 46, the bevel gear 44, and the bevel gear 40 to continuously vary the positioning outwardly of the plates 34 and 36 and the forming members carried thereby relative to the path of workpiece movement as the workpiece moves through the roll-forming machine. By this means the roll-forming machine functions to form the workpiece 100 illustrated in FIG. 3 which is characterized by the fact that the width of the web 102 varies continuously along the length of the workpiece 100.

Referring again to FIG. 2, the foregoing operation of the die-stand 24 and the guide assembly 26 of the spine/die-stand assembly 20 continues until the tail end of the workpiece has passed through the guide assembly 26. A motor 184 is connected to the lead screw 170 of the guide assembly 26 through an electrically actuated clutch 186. When the tail end of the workpiece has passed through the guide assembly 26, the lever 176 returns to its initial position, thereby de-actuating the switch 178. Upon de-actuation of the switch 178, the clutch 82 is disengaged, the motor 184 is actuated, and the clutch 186 is engaged. The motor 184 thereupon operates through the lead screw 70, the sprocket 86, the chain 88, and the sprocket 90 to return the guide rollers 72 inwardly to their initial positions. Operation of the motor 184 continues until one of the members 76 engages a lever 188 which actuates a switch 190. Upon actuation of the switch 190, operation of the motor 184 is terminated and the clutch 186 is disengaged. At this point, the guide assembly 26 of the spine/die-stand assembly 20 is ready to receive another workpiece.

Referring again to FIG. 4, each die-stand 24 includes a motor 192 which is connected to an upper lead screw 30 of the die-stand through an electrically actuated clutch 194. As the tail end of a workpiece passes through the die-stand 24, the lever 180 returns to its initial position, thereby de-actuating the switch 182. Upon de-actuation of the switch 182, the clutch 42 is disengaged, the motor 192 is actuated, and the clutch 194 is engaged. The motor 192 thereupon functions to return the component parts of the die-stand to their initial positions. Operation of the motor 192 continues until one of the members 38 engages a lever 196 thereby actuating a switch 198. Upon actuation of the switch 198, operation of the motor 192 is terminated and the clutch 194 is disengaged. At this point the die-stand is positioned to receive the front end of another workpiece.

Figure 5:
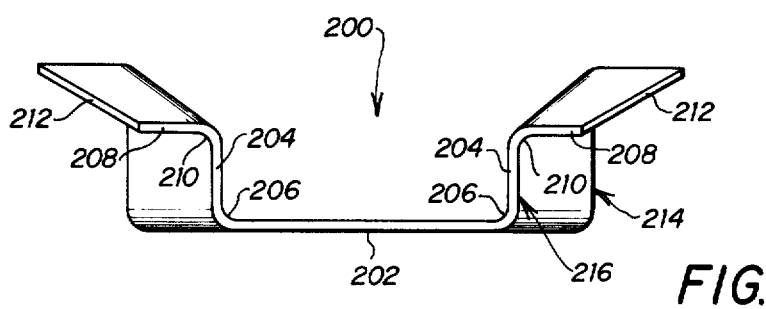
FIG. 5 is an illustration of another cross-sectional configuration which may be formed by means of the invention.

Referring now to FIG. 5, there is shown a workpiece 200 which may be formed by means of the present invention. The workpiece 200 is of the type known as "hat section" and includes a base or web 202 and opposed sides 204. The sides 204 are separated from the web 202 by side bends 206. The workpiece 200 further includes opposed flanges 208 each extending from one of the sides 204 and separated therefrom by a flange bend 210. The flanges 208 extend to edges 212. The workpiece 200 differs from hat section type workpieces formed in conventional roll-forming machines in that the width dimension of the web 202, the height dimensions of the sides 204, and the width dimensions of the flanges 208 all vary continuously along the length of the workpiece 200. Thus, the workpiece 200 extends from a relatively large end 214 to a relatively small end 216.

Figure 6:
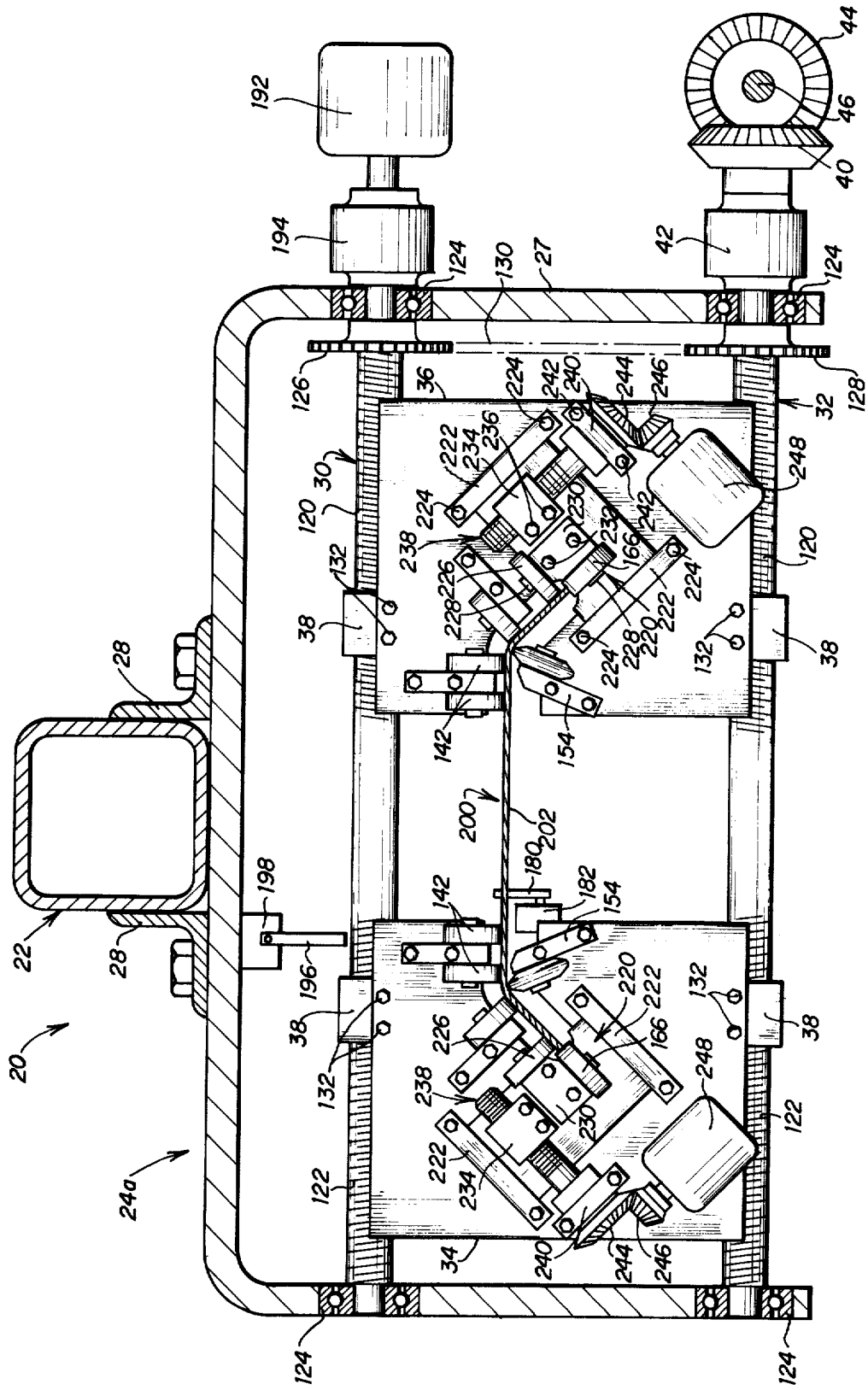
FIGS. 6 and 7 are illustrations of die-stands utilized in a second embodiment of the invention.
Figure 7:
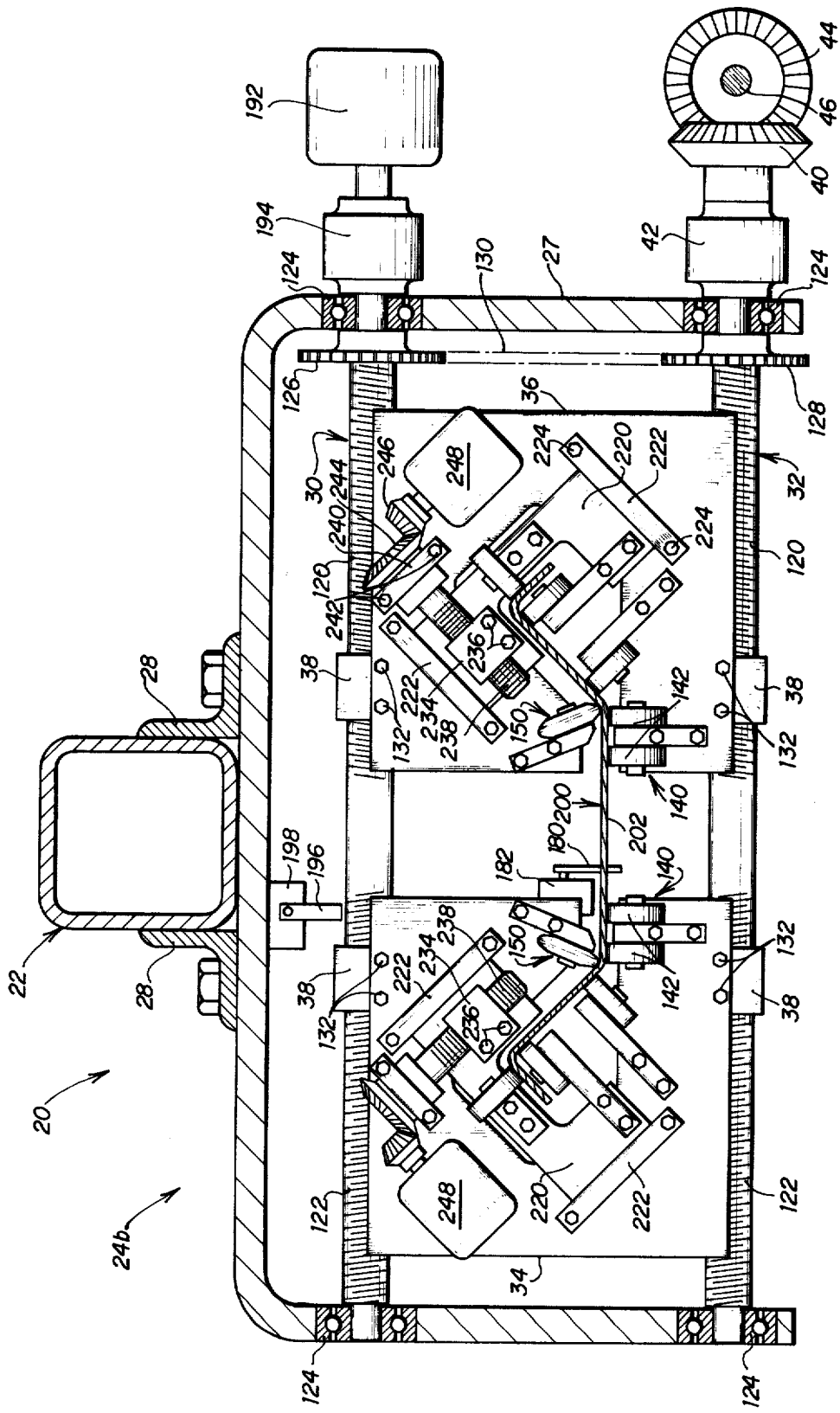

The workpiece 200 is formed in two stages utilizing the die-stands 24a of the type shown in FIG. 6 and the die-stands 24b of the type shown in FIG. 7. Referring particularly to FIG. 6, the die-stand 24a is utilized partially to form the flanges 208 and the flange bends 210 of the workpiece 200. Many of the component parts of the die-stand 24a are substantially equivalent in construction and function to component parts of the die-stand 24 illustrated in FIG. 4. For the sake of clarity and brevity, such equivalent parts are identified in FIG. 6 with the same reference numerals that were utilized hereinbefore in the description of the die-stand 24.

The die-stand 24a differs from the die-stand 24 primarily in that it includes two secondary plates 220. The plates 220 are slidably supported in ways 222 which are in turn secured to the plates 34 and 36 by fasteners 224. Each plate 220 supports the side roller 166 and a secondary bend roller 226. The rollers 166 and 226 are supported on shafts 228 extending from a bracket 230 which is secured to the secondary plate 220 by fasteners 232.

Each secondary plate 220 also supports a nut 234 which is secured to the plate by fasteners 236. The nut 234 threadedly engages a lead screw 238 which is rotatably supported on the plate 34 or the plate 36 by a bracket 240 and fasteners 242.

The lead screw 238 extends to a bevel gear 244. The bevel gear 244 is mounted in mesh with a bevel gear 246 secured to the output shaft of a servo motor 248. Thus, upon actuation of the servo motor 248, the lead screw and the nut 234 function to move the rollers 166 and 226 supported on the secondary plate 220 relative to the remaining rollers 142, 150 and 158 supported on the plate 34 or 36.

In the operation of a die-stand 24a, the servo motor 248 is actuated continuously during the movement of the workpiece 200 through the die-stand. Simultaneously, the plates 34 and 36 and all of the forming members carried thereby are continuously moved relative to the path of workpiece movement as the workpiece moves through the die-stand. During the passage of the workpiece through the die-stand 24a, the secondary bend rollers 226 cooperate with the primary bend rollers 158 in forming the flanges 208 and the flange bends 210 of the workpiece 200.

As will be appreciated by those skilled in the art, the spine/die-stand assembly 20 comprises a plurality of die-stands 24a which function to progressively form the flanges 208 and the flange bends 210 of the workpiece 200 as the workpiece passes through a roll-forming machine incorporating the assembly 20. Thereafter the workpiece 200 moves through a plurality of die-stands 24b which function to progressively form the sides 204 and the side bends 206 of the workpiece 200. As such, the die-stands 24b may be utilized either in the same roll-forming machine as the die-stands 24a or in a separate roll-forming machine, in accordance with particular requirements.

Many of the component parts of the die-stand 24b are substantially equivalent in function and operation to component parts of the die-stand 24 illustrated in FIG. 4. Other component parts of the die-stand 24b are substantially equivalent to component parts of the die-stand 24a illustrated in FIG. 6. For the sake of clarity and brevity, all such equivalent parts of the die-stand 24b are identified in FIG. 7 with the same reference numerals utilized heretofore in connection with the description of the die-stand 24 and in connection with the description of the die-stand 24a.

The die-stand 24b operates similarly to the die-stand 24a. Thus, as the workpiece 200 moves through the die-stand 24b, the plates 34 and 36 are simultaneously moved relative to the path of workpiece movement, and the rollers 166 and 226 are simultaneously moved relative to the rollers 142, 150 and 158. By this means the die-stands 24b function to complete the formation of the workpiece 200 into the desired configuration in which the width of the web 202, the heights of the sides 204, and the widths of the flanges 208 all vary continuously along the length of the workpiece 200.

In FIG. 5 there is shown a workpiece 250 which may be formed by means of the present invention. The workpiece 250 is of the type known as a "C section", and includes a base or web 252 and opposed sides or flanges 254 which are separated from the web 252 by flange bends 256. The workpiece 250 further includes lips 258 extending from the flanges 254 and separated therefrom by lip bends 260. The lips 258 extend to edges 262. The workpiece 250 differs from C section type workpieces formed in conventional roll-forming machines in that the width dimensions of the web 252 and the height dimensions of the flanges 254 both vary continuously along the length of the workpiece 250. Thus, the workpiece 250 extends from a relatively large end 264 to a relatively small end 266.

The workpiece 250 is formed by means of a spine/die-stand assembly 20 incorporating a series of die-stands 24c of the type illustrated in FIG. 9. Many of the component parts of the die-stand 24c are substantially equivalent in construction and operation to component parts of the die-stand 24 illustrated in FIG. 4 and to component parts of the die-stand 24a illustrated in FIG. 6. For the sake of clarity and brevity, such component parts are designated in FIG. 9 with the same reference numerals utilized hereinbefore in connection with the description of the die-stand 24 and in connection with the description of the die-stand 24a.

One primary distinction between the die-stand 24c and the die-stand 24a is that a support roller 268, a toroidal roller 270, and a primary bend roller 272 are mounted on the plate 220 in addition to the guide roller 166. The support roller 268 is rotatably supported on a shaft 274 extending from a bracket 276 which is secured to the plate 220 by fasteners 278. The toroidal roller 270 is rotatably supported on a shaft 280 extending from a bracket 282 which is secured to the plate 220 by fasteners 284. The primary bend roller 272 is rotatably supported on a shaft 286 extending from the bracket 230 which supports the guide roller 166. The rollers 268, 270 and 272 function to form the lip bends 260 of the workpiece 250.

The die-stand 24c operates similarly to the die-stand 24a. Thus, as the workpiece 250 moves through the die-stand 24c the positioning of the plates 34 and 36 and all of the forming members carried thereby is continuously varied relative to the path of workpiece movement. Simultaneously, the positioning of the support roller 268, the toroidal roller 270, the primary bend roller 272, and the guide roller 166 is continuously varied relative to the positioning of the support rollers 142, the toroidal roller 150, and the primary bend roller 158. By this means the workpiece 150 is progressively formed into a desired configuration characterized by the fact that the width dimension of the web 252 and the height dimensions of the flanges 254 vary continuously along the length of the workpiece.

In each of the embodiments of the invention disclosed hereinbefore, the workpiece enters the roll-forming machine small end first. Certain component parts of the roll-forming machine, particularly the switches, are therefore positioned to accommodate the condition of the small end of the workpiece entering the roll-forming machine first. It will be understood, however, that each embodiment of the invention is also adapted to receive the workpiece large end first, in which event certain component parts of the roll-forming machine are repositioned to accommodate the latter condition.

From the foregoing, it will be understood that the present invention comprises substantial improvements in the art of roll-forming machines. Perhaps the primary advantage deriving from the use of the invention relates to the fact that by means thereof it is possible to form a workpiece having one or more dimensions which vary continuously lengthwise of the workpiece. As such, the present invention permits the manufacture of workpieces which cannot be formed by means of conventional roll-forming machines.

Although the preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

What is claimed is:

1. A roll-forming machine comprising:
   means defining a path of movement of a workpiece to be formed;
   an elongate, rigid spine;
   a plurality of sets of upper and lower forming members each supported by the spine and mounted at spaced points therealong for progressively transforming the workpiece from an initial configuration to a desired configuration;
   said forming members comprising a plurality of die-stands each including a frame rigidly secured to the spine and a plurality of rollers supported for engagement with material moving along the path;
   means for locating the spine relative to the path of workpiece movement and thereby positioning the forming members at spaced points along the path for engagement with the workpiece moving therealong; and
   means for continuously varying the positioning of the forming rollers transversely with respect to the path as the workpiece moves therealong and thereby forming the workpiece into a desired configuration characterized by a transverse dimension which varies lengthwise of the workpiece.

2. The roll-forming machine according to claim 1 wherein each set of upper and lower forming members comprises a plurality of forming members and further including means for continuously varying the positioning of at least one forming member of each set relative to the path of workpiece movement and thereby forming the workpiece into a desired configuration characterized by an additional dimension which varies lengthwise of the workpiece.

3. The roll-forming machine according to claim 1 wherein each die-stand comprises:
   a plate having at least one of the forming rollers supported thereon; and
   means for varying the positioning of the plate relative to the frame at a predetermined rate.

4. The roll-forming machine according to claim 3 further including means for continuously varying the positioning of at least one of the forming rollers relative to the plate.

5. For use in a roll-forming machine, a die-stand comprising:
   a substantially rigid frame;
   a first plate;
   a first forming member supported on the first plate for engagement with a workpiece passing through a roll-forming machine to at least partially transform the workpiece from an initial configuration to a desired configuration;
   a second plate;
   a second forming member supported on the second plate; and
   means for continuously varying the positioning of the plates and the forming members supported thereby relative to the frame as the workpiece moves through the roll-forming machine and thereby forming the workpiece into a desired configuration characterized by a dimension that varies lengthwise of the workpiece;
   said plate positioning means further comprising means for effecting equal and opposite movement of the two plates with respect to the frame.

6. The die-stand according to claim 5 further including at least one lead screw connected between the frame and the plates, and means for selectively rotating the lead screw and thereby varying the positioning of the plates and the forming members supported thereby relative to the frame.

7. The die-stand according to claim 5 further characterized by means for continuously varying the positioning of at least one of the forming members with respect to its supporting plate as the workpiece moves through the roll-forming machine and thereby changing the roll-forming configuration of the roll-forming machine.

8. The die-stand according to claim 7 wherein the means for positioning the forming member relative to the plate comprises servo means connected between the plate and the forming member supported thereon.

9. For use in a roll-forming machine, a die-stand comprising:
   a substantially rigid frame;
   first and second plates;
   first and second forming members supported on the first and second plates, respectively, for engagement with a workpiece passing through the roll-forming machine to at least partially transform the workpiece from an initial configuration to a desired configuration; and
   means for continuously varying the positioning of the plates and the forming members relative to the path of movement of the workpiece as it moves through the roll-forming machine and thereby forming the workpiece into a desired configuration which varies lengthwise thereof;
   said positioning means comprising means for effecting equal and opposite movement of the two plates relative to the path of material movement through the roll-forming machine.

10. The die-stand according to claim 9 wherein the positioning means comprises a lead screw connected between the frame and the plates and means for selectively rotating the lead screw and thereby positioning the plates.

11. The die-stand according to claim 9 wherein one of the plates supports at least two forming members and further including means for continuously varying the positioning of one of the forming members on the plate relative to the other as the workpiece moves through the roll-forming machine and thereby forming the workpiece into a desired configuration that varies in at least two respects lengthwise thereof.

12. For use in a roll-forming machine, a die-stand comprising:
- a frame;
- a lead screw rotatably supported on the frame;
- a first plate;
- at least one forming member supported on the first plate for engagement with a workpiece passing through the roll-forming machine to at least partially transform the workpiece from an initial configuration to a desired configuration;
- a member secured to the first plate and threadedly engaging the lead screw;
- a second plate;
- a second forming member supported on the second plate for engagement with the workpiece moving through the roll-forming machine to at least partially transform the workpiece from an initial configuration to a desired configuration;
- a member secured to the second plate and threadedly engaging the lead screw; and
- means for continuously rotating the lead screw relative to the frame as the workpiece moves through the roll-forming machine to continuously vary the positioning of the plate and the forming member supported thereby relative to the path of workpiece movement through the roll-forming machine and thereby forming the workpiece into a desired configuration that varies lengthwise thereof;
- said lead screw and the members threadedly engaged therewith comprising means for effecting equal and opposite movement of the two plates and the forming members supported thereby relative to the path of workpiece movement through the roll-forming machine.

13. For use in a roll-forming machine, a die-stand assembly comprising:
- an elongate, rigid spine;
- a plurality of substantially rigid frames secured to the spine at spaced points therealong;
- a plurality of plates each supported on one of the frames;
- a plurality of forming members each supported on one of the plates for engagement with a workpiece passing through the roll-forming machine to progressively transform the workpiece from an initial configuration to a desired configuration;
- means for continuously varying the positioning of all of the plates and the forming members carried thereby relative to the path of workpiece movement as the workpiece moves through the roll-forming machine and thereby forming the workpiece into a desired configuration which varies continuously lengthwise thereof;
- a guide assembly mounted on the elongate, rigid spine and comprising at least two guide members for guiding the workpiece into the roll-forming machine; and
- means for continuously varying the positioning of the guide members relative to the path of workpiece movement as the workpiece moves into the roll-forming machine.

14. The die-stand assembly according to claim 13 further characterized by:
- a plurality of second plates each supported by one of the frames;
- a plurality of second forming members each supported on one of the second plates; and
- wherein the positioning means also continuously varies the positioning of all of the second plates relative to the path of workpiece movement as the workpiece moves through the roll-forming machine.

15. The die-stand assembly according to claim 13 wherein each of the plates supports first and second forming members, and further including means for continuously varying the positioning of all of the first forming members relative to the path of workpiece movement and relative to the second forming members as the workpiece moves through the roll-forming machine and thereby forming the workpiece into a desired configuration which varies in at least two respects lengthwise thereof.

16. The die-stand assembly according to claim 13 wherein the guide assembly is further characterized by two longitudinally spaced apart sets of guide members and further including means for selectively varying the positioning of the guide members comprising one of the sets transversely with respect to the path of workpiece movement independent of the positioning of the guide members comprising the other set.

17. For use in a roll-forming machine, a die-stand assembly comprising:
- an elongate, rigid spine;
- a plurality of substantially rigid frames secured to the spine at spaced points therealong;
- a plurality of plates each supported on one of the frames;
- a plurality of forming members each supported on one of the plates for engagement with a workpiece passing through the roll-forming machine to progressively transform the workpiece from an initial configuration to a desired configuration; and
- means for continuously varying the positioning of the forming members relative to the path of workpiece movement as the workpiece moves through the forming machine and thereby forming the workpiece into a desired configuration which varies lengthwise thereof.

18. The die-stand assembly according to claim 17 further comprising a second plurality of forming members each supported on one of the plates, and wherein the positioning means functions to continuously vary the positioning of all of the forming members comprising the first plurality relative to the forming members comprising the second plurality as the workpiece moves through the roll-forming machine.

19. The die-stand assembly according to claim 17 further including means for continuously varying the positioning of the plates and the forming members supported thereby relative to the path of workpiece movement as the workpiece moves through the roll-forming machine and thereby forming the workpiece into a desired configuration which varies in at least two respects lengthwise thereof.

20. The die-stand assembly according to claim 17 further including a guide assembly supported on the elongate, rigid spine and including guide members for engaging the opposite edges of the workpiece as it enters the roll-forming machine, and wherein the positioning means also continuously varies the positioning of the guide member relative to the path of workpiece movement as the workpiece moves through the roll-forming machine.

* * * * *